(12) United States Patent
Dowdy

(10) Patent No.: US 6,854,528 B2
(45) Date of Patent: Feb. 15, 2005

(54) LIVESTOCK BEDDING CONDITIONING APPARATUS

(76) Inventor: Brad Dowdy, 732 Peggy St., Tulare, CA (US) 93274

( * ) Notice: Subject to any disclaimer, the term of this patent is extended or adjusted under 35 U.S.C. 154(b) by 0 days.

(21) Appl. No.: 10/376,575

(22) Filed: Feb. 27, 2003

(65) Prior Publication Data

US 2004/0182586 A1 Sep. 23, 2004

(51) Int. Cl.[7] ............................................. A01B 33/02
(52) U.S. Cl. ..................... 172/817; 172/246; 172/568
(58) Field of Search ........................ 172/817, 246, 172/199, 568, 98

(56) References Cited

U.S. PATENT DOCUMENTS

| | | | | |
|---|---|---|---|---|
| 2,749,824 A | * | 6/1956 | Friday | 172/5 |
| 3,059,704 A | * | 10/1962 | Kasatkin | 172/38 |
| 3,169,583 A | * | 2/1965 | Thurow | 172/111 |
| 3,190,364 A | * | 6/1965 | Maloney | 173/189 |
| 4,002,205 A | * | 1/1977 | Falk | 172/15 |
| 4,206,580 A | * | 6/1980 | Truax et al. | 56/10.4 |
| 4,287,955 A | * | 9/1981 | Anderson | 172/98 |
| 4,332,299 A | * | 6/1982 | Parks et al. | 172/98 |
| 4,491,183 A | * | 1/1985 | Anderson et al. | 172/5 |
| 4,544,038 A | * | 10/1985 | Schonert | 172/78 |
| 4,660,649 A | * | 4/1987 | Anderson et al. | 172/2 |
| 4,958,457 A | * | 9/1990 | Doskocil | 37/94 |
| 5,873,417 A | * | 2/1999 | Halischuk | 172/246 |
| 6,056,067 A | * | 5/2000 | Brown | 172/111 |

* cited by examiner

Primary Examiner—Robert E. Pezzuto
Assistant Examiner—Alexandra K. Pechhold
(74) Attorney, Agent, or Firm—James M. Duncan

(57) ABSTRACT

A livestock bedding conditioning apparatus is disclosed, the apparatus comprising a self-propelled drive vehicle with a rotor arm attached to a frame on the vehicle. The rotor arm comprises a plurality of rotors, the device having hydraulic motor for rotating the rotors. Each rotor has a bit at its end, which engages the livestock bedding material. The rotation of the bit within the bedding material loosens, fluffs up and aerates the bedding material, resulting in a healthier and more comfortable bedding material for the livestock.

36 Claims, 7 Drawing Sheets

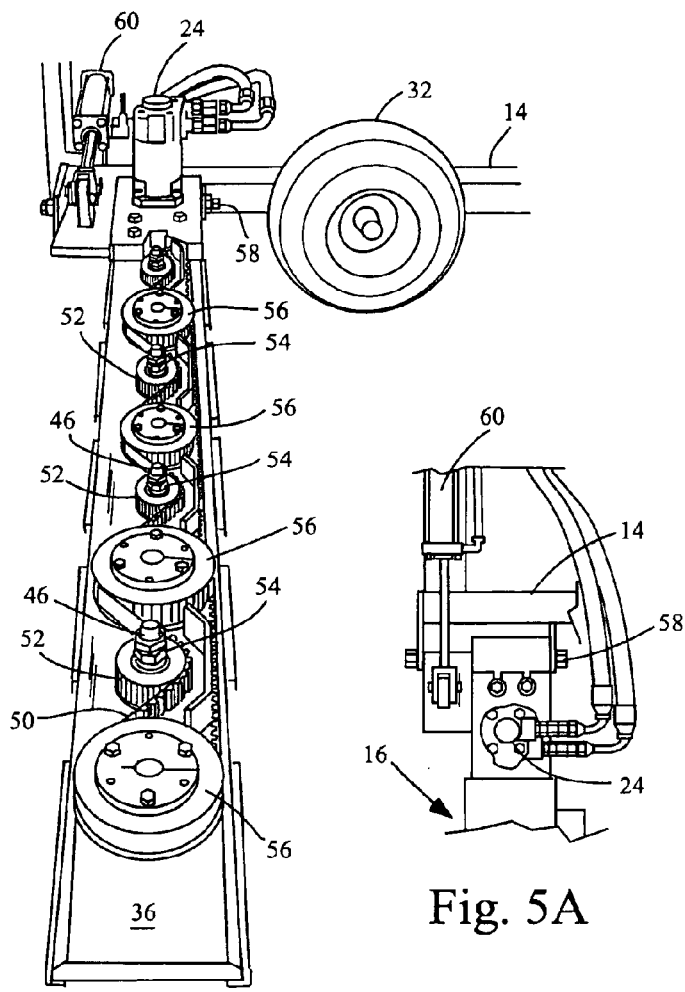
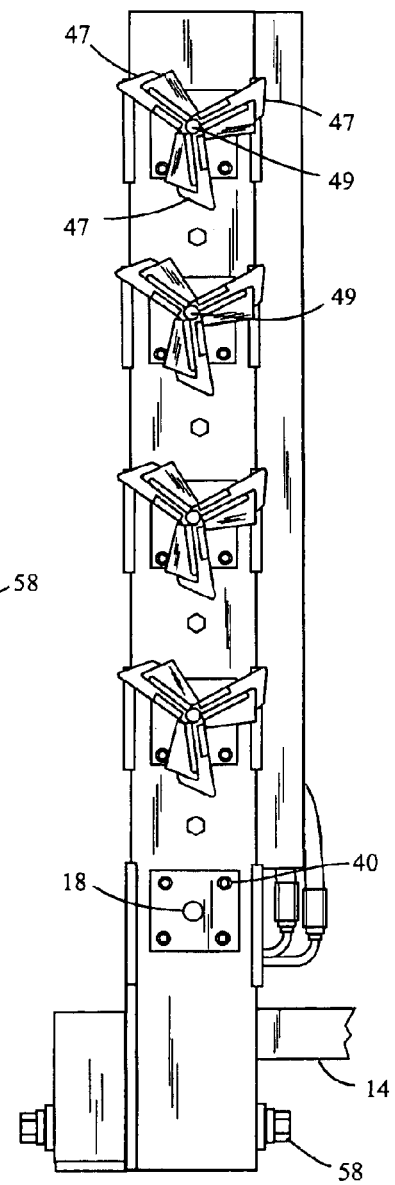
Fig. 5
Fig. 5A
Fig. 6

LIVESTOCK BEDDING CONDITIONING APPARATUS

BACKGROUND OF THE INVENTION

The present invention generally relates to devices used for protecting the health of livestock, and increasing production of livestock products, such as milk. The present invention more specifically relates to conditioning livestock bedding by breaking up, aerating and grooming of the bedding material. Conditioning the bedding in this manner softens the bedding material and reduces moisture and bacteria propagation, which helps to create an environment which protects the health of the animals and increases their productivity.

In a typical free-stall barn, the free-stall beds are positioned on either side of a drive-through alley or lane. Over time, the bedding materials in the free-stall beds will become compacted by the animals, and will be wetted with various solids and liquids, including manure and urine. The compacted bedding materials become hard and uncomfortable for the animal. In particular, manure can form a hard crust. In addition, because of the lack of air and the presence of the various solids, liquids and the associated gases, the bedding material becomes a breeding habitat for various bacteria which can be harmful to the animal. For example, wet bedding is an ideal environment for microorganism growth which can result in a cow contracting mastitis, i.e., inflammation of the mammary gland.

It is known to use rake devices to break up the bedding, where the rake tines are dragged across the bedding. It is known to mount the rake devices on vehicles which are driven down the drive-through alley or lane, with the rake device extending to the side of the vehicle. The raking device is then extended into each stall adjacent to the alley, raking over the bedding material. However, rake tines are often not capable of penetrating severely compacted bedding and crusted manure, such that there is limited agitation and aeration of the bedding material. If only the surface of the bedding is agitated, the underlying material remains compacted, hard and uncomfortable for the animal and insufficiently aerated to prevent growth of anaerobic bacteria. A device is required which provides deeper penetration and greater agitation of livestock bedding materials.

SUMMARY OF THE INVENTION

The present invention is directed to an apparatus for conditioning livestock bedding, which effectively softens and aerates the bedding.

One embodiment of the apparatus comprises a self-propelled drive vehicle having a front and a back. A frame is attached to the vehicle and a rotor arm having a top side and a bottom side extends from the frame. A plurality of bearing units are set within the rotor arm, with the bearing units extending from the top side to the bottom side of the rotor arm. A plurality of rotors are set within the bearing units, with each rotor comprising a shaft having a first end and a second end. The first and second end of the shaft define a longitudinal axis. The first end of the shaft comprises a bit, which engages the bedding material. The shaft extends through the bearing unit with the first end of the shaft, including the bit, on the bottom side of the rotor arm. The second end of the shaft is on the top side of the rotor arm. The apparatus further comprises means for rotating the rotors.

One embodiment of the apparatus has the frame attached to the front of the drive vehicle. The rotor arm may also be pivotally attached such that the rotor arm is pivotable through a range of positions from an approximately horizontal first position to an approximately vertical second position. This feature allows the operator of the apparatus to drive down a drive-through alley of a barn and selectively lower the rotor arm so that the bit of the rotor engages and tills the bedding material of the selected stall. The frame may further comprise a ground engaging support wheel which engages the surface of the alley, providing additional support for the frame. The frame may further comprise a curb scraper, which contacts the alley curbing, thereby scraping the curb clean and also providing a guide for the vehicle operator to maintain the proper position of the vehicle within the alley. The frame may further comprise an alley scraper, which is a blade which engages and cleans the alley surface.

The rotor may further comprise gussets which, as the bit rotates deeper into the bedding material, lifts the loosened material allowing deeper penetration and greater aeration of the bedding.

These and other features, aspects, and advantages of the present invention will become better understood with regard to the following description, appended claims, and accompanying drawings.

BRIEF DESCRIPTION OF THE DRAWINGS

FIG. 5 is a detailed top view of one embodiment of the rotor arm.

FIG. 5A is a detailed view showing how the rotor arm of FIG. 5 attaches to the frame.

FIG. 6 is a detailed bottom view of one embodiment of the rotor arm.

DETAILED DESCRIPTION OF THE EMBODIMENTS

Figure 1:
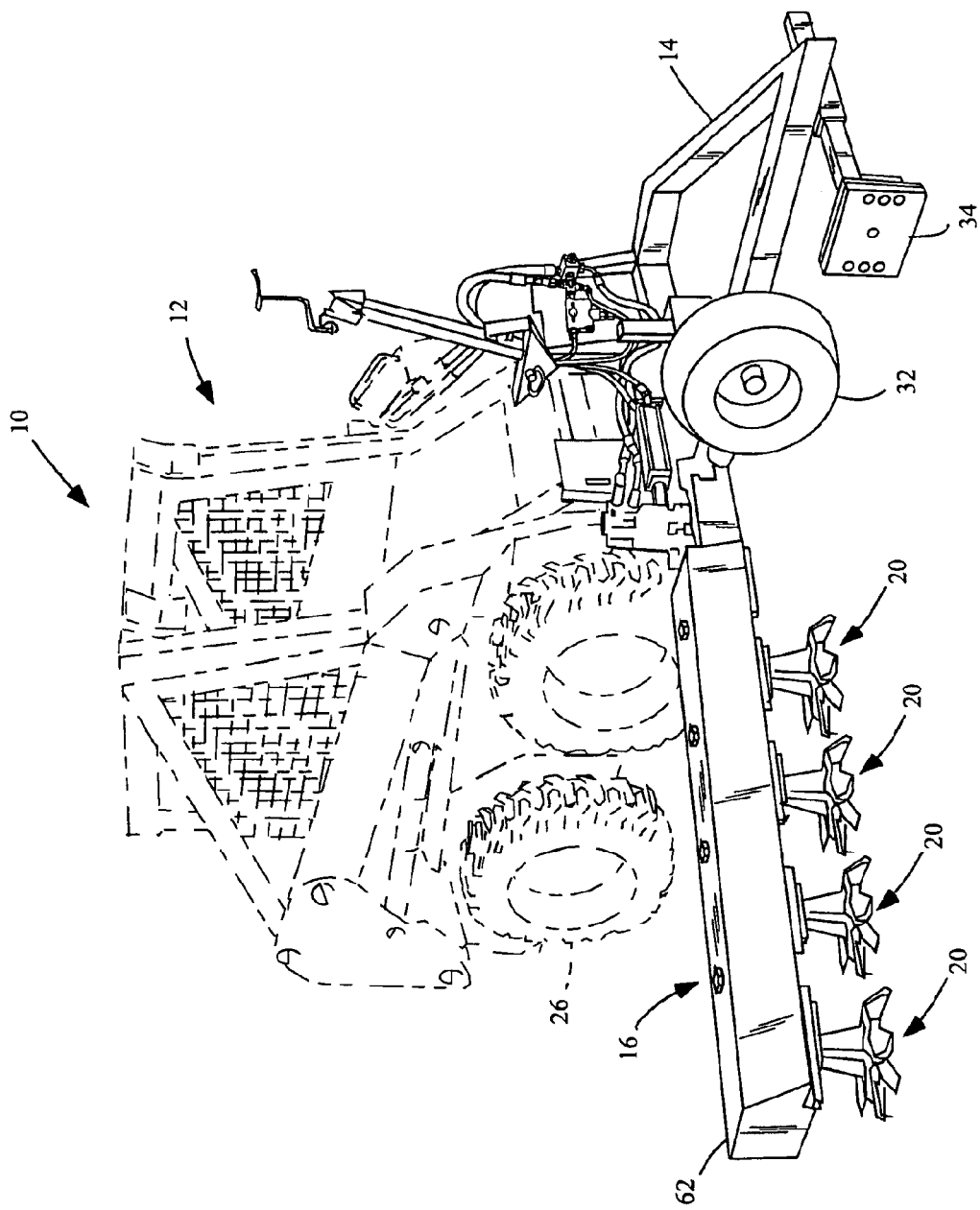
FIG. 1 is a perspective view of one embodiment of the disclosed livestock bedding conditioning apparatus with the rotor arm in a lowered position.

Referring now specifically to the drawings, FIG. 1 shows a perspective view of one embodiment 10 of the disclosed livestock bedding apparatus. This embodiment generally comprises a self-propelled drive vehicle 12. Frame 14 is attached to the vehicle 12. Rotor arm 16 extends from the frame 14. A plurality of bearing units 18 (shown in FIG. 6) are set within the rotor arm 16. A plurality of rotors 20 are set within the bearing units 18. Attached to each rotor 20 is a ground engaging bit 22. The apparatus further comprises means for rotating the rotors, such as hydraulic motor 24. Acceptable hydraulic motors include those manufactured by CHAR-LYNN As the drive vehicle 12 travels the drive-through alley of a barn, the rotor arm 16 is extended over the bedding material of a stall and rotors 20 are set within the bedding material. The rotors are engaged to rotate within the bedding, thereby breaking up the crusted and compacted bedding so that the bedding material is fluffed up and aerated.

Drive vehicle 12 is self-propelled, and might either have ground-engaging wheels 26 or, alternatively, tracks. Included among the acceptable vehicles are skid steers, as shown in FIGS. 1 through 4, and tractors. Acceptable skid steers are manufactured by JOHN DEERE, NEW HOLLAND, CASE, GALE and BOBCAT.

The vehicle 12 has a front 28 and a back 30. It is to be appreciated that frame 14 may be attached to either the front 28 of the drive vehicle 12, as shown in the figures, or, alternatively, attached to the back 30. Because many of the available drive vehicles 12 function in both forward and reverse, and because the operator's seat is often capable of swiveling, identifying one end of the vehicle 12 as the front 28 and the other end 30 as the back may be a distinction without a difference.

Figure 2:
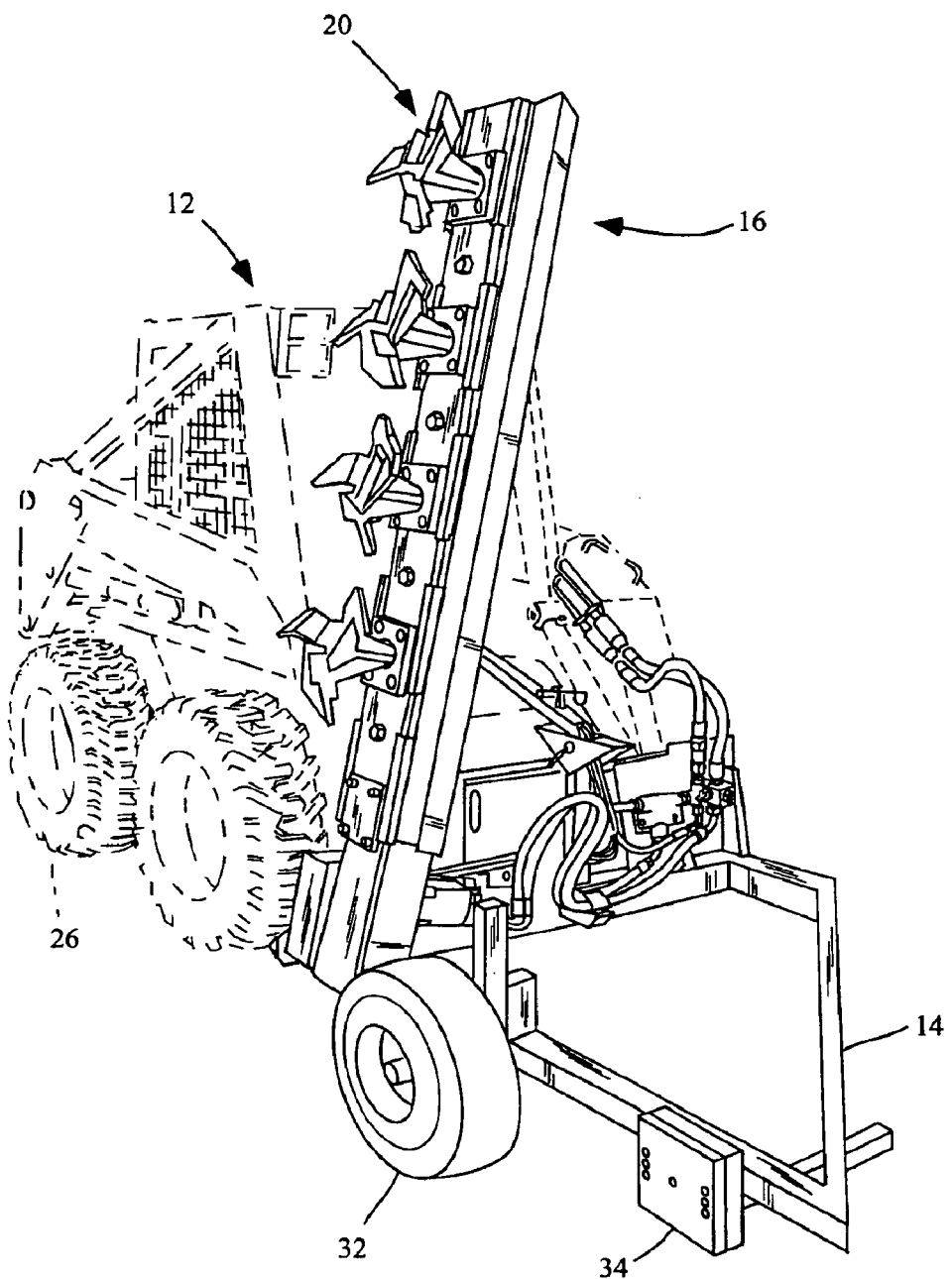
FIG. 2 is a perspective view of one embodiment of the disclosed livestock bedding conditioning apparatus with the rotor in a raised position.
Figure 3:
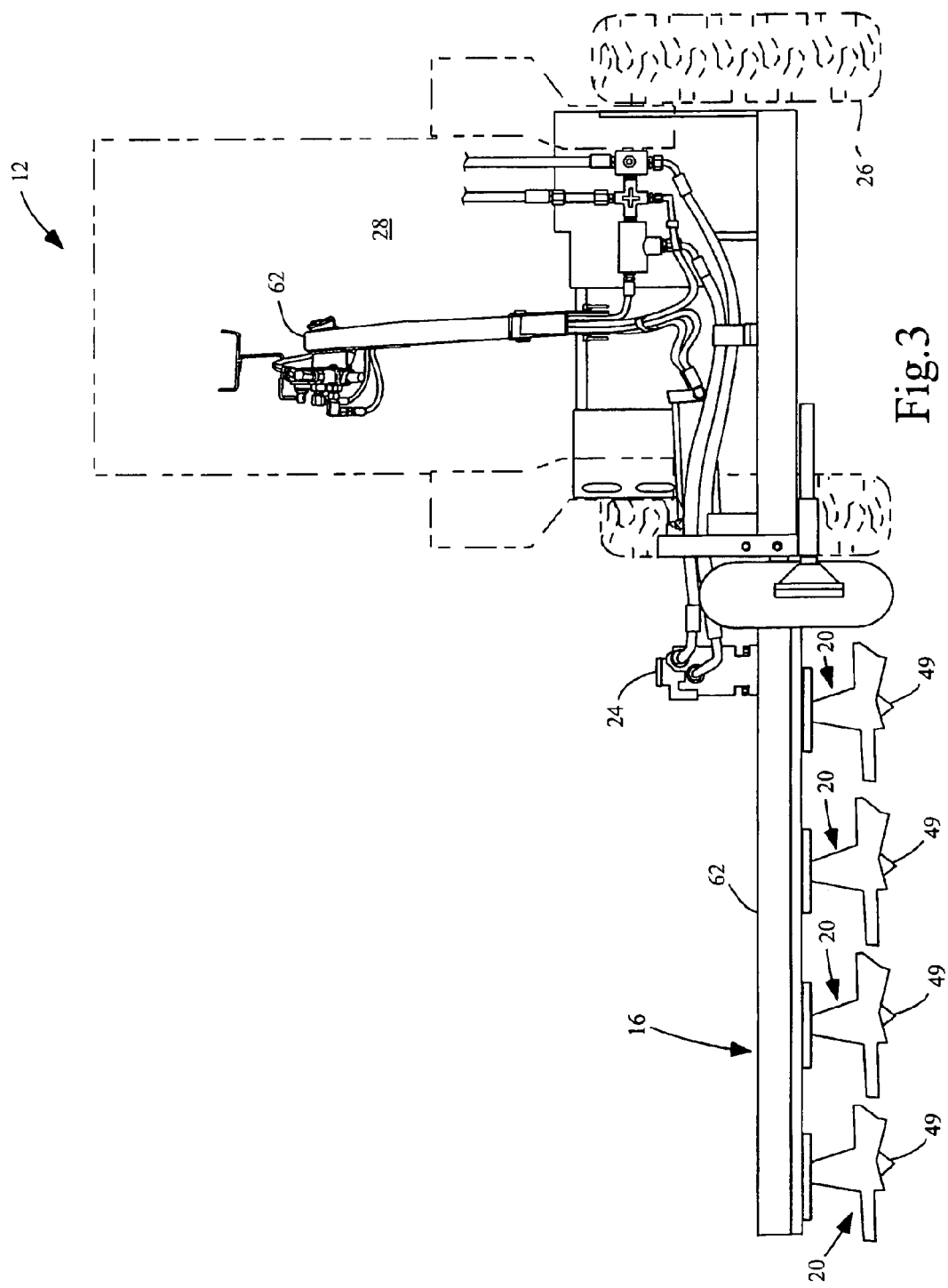
FIG. 3 is a front view of the apparatus shown in FIG. 1.
Figure 4:
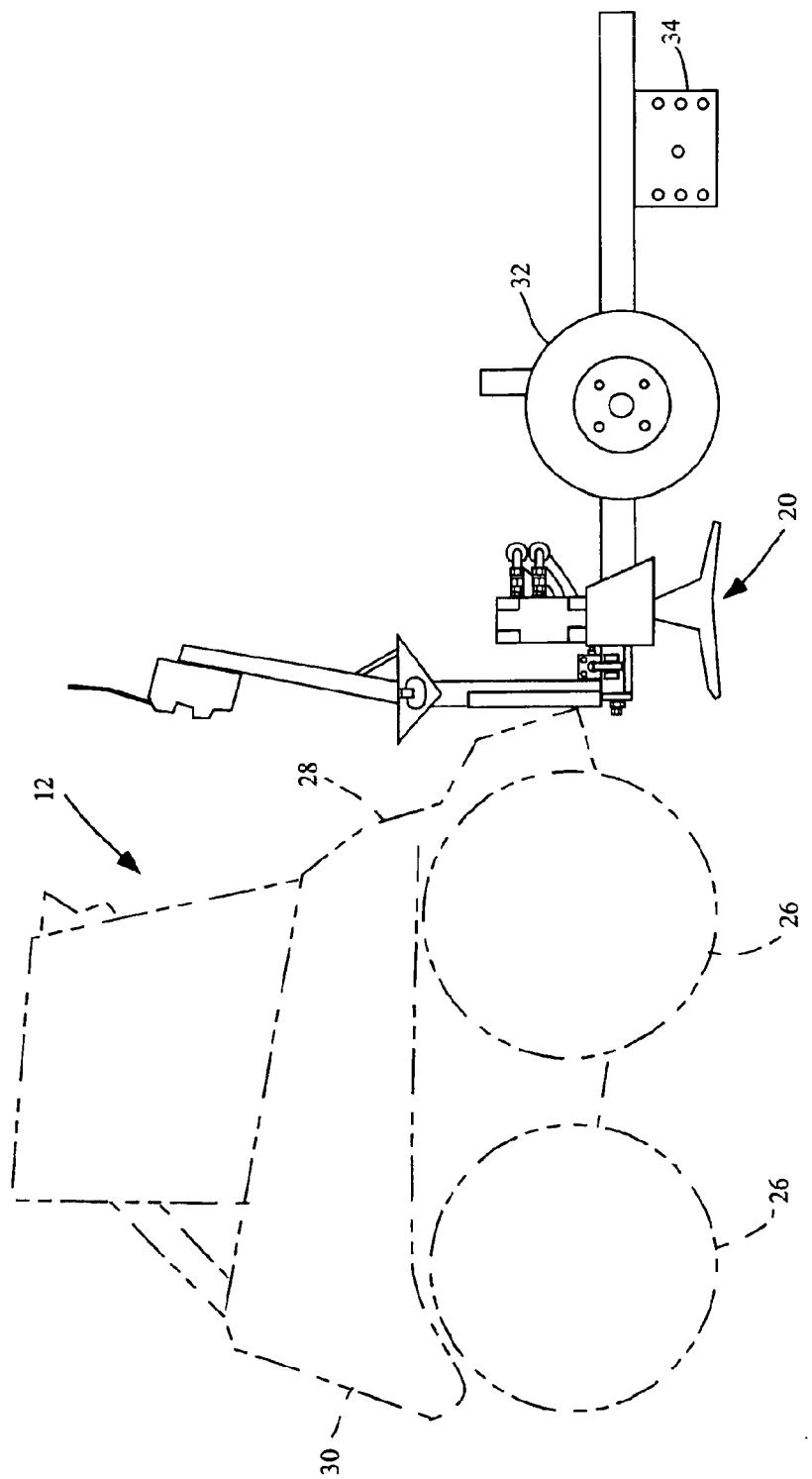
FIG. 4 is a side view of the apparatus shown in FIG. 1.

Frame 14 may be fabricated from steel stock or other materials having sufficient strength to bear the static and dynamic loads imposed by rotor arm 16. While the shape of the stock may be rectangular as shown in the figures, round, oval, triangular or L-shaped stock may also be used to fabricate frame 14. As shown in FIG. 1 and FIG. 2, frame 14 may be formed in the shape of a polygon or other shapes having sufficient strength and mechanical properties. As further shown in the figures, a ground-engaging support wheel 32 may be attached to frame 14 to provide additional support to the frame in carrying the various loads which may be imposed upon it. In addition, a curb scraper 34 may be attached to frame 14. In many livestock facilities, the drive-through alley may have curbing lining the alley, where the curbing is adjacent to the livestock stalls and bedding. As the drive vehicle 12 proceeds down the alley, the curb scraper 34 may be set against the curbing. Thus engaged, the curb scraper 34 not only cleans the curbing, but it also provides a guide for the vehicle operator, assisting the operator in maintaining the vehicle in the proper position within the drive-through alley.

As can be seen in FIG. 5 and FIG. 6, rotor arm 16 comprises a top side 36 and a bottom side 38. Rotor arm 16 further comprises a plurality of rotors 20 which rotate within bearing units 18 which are set within the rotor arm. Bearing units 18 may be rolling element or sleeve type bearings which mounted within the rotor arm 16, as with a bearing plate 40 as shown in FIG. 6.

Figure 7:
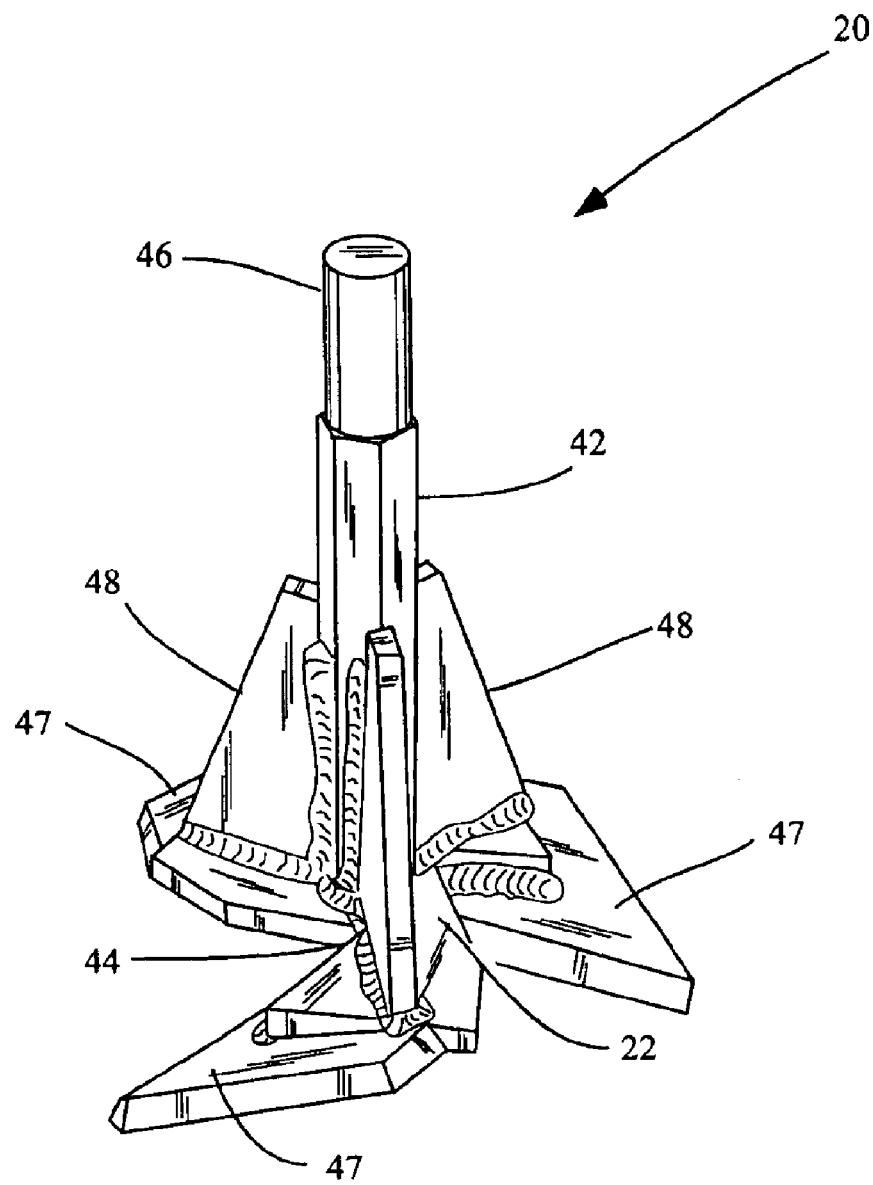
FIG. 7 is a detailed view of one embodiment of a rotor.
Figure 8:
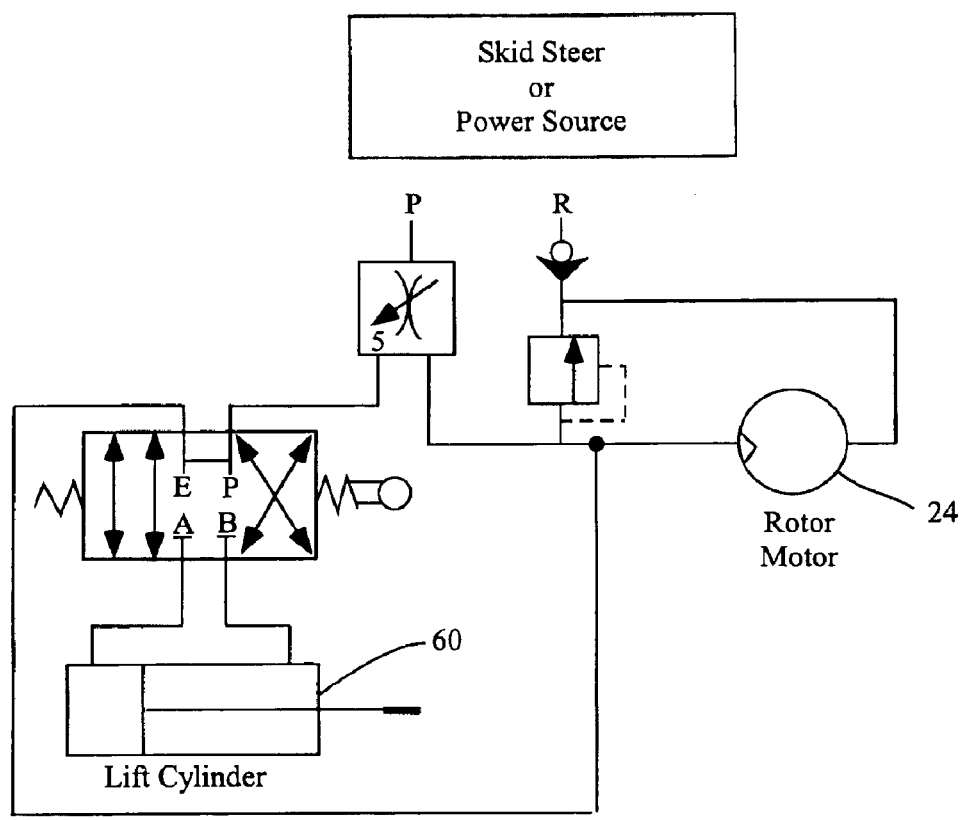
FIG. 8 is an example hydraulic schematic showing how a hydraulically operated apparatus may be connected.

As shown in FIG. 7, rotors 20 comprise a shaft 42, the shaft having a first end 44 and a second end 46. The first end 44 and second end 46 of the shaft define a longitudinal axis, where the longitudinal axis is at a right angle to the rotor arm 16. The rotor may be fabricated from 1-⅛" diameter hexagonal stock, where the second end 46 of the shaft has been machined into a round configuration. Rotors 20 further comprise bit 22 at the first end 44 of each shaft 42. Bit 22 has blades 47 which engage the bedding material. It is to be appreciated that a variety of different bit configurations might be used to condition the bedding material. In general, any bit 22 which penetrates the bedding material and breaks it up by the rotational motion of the bit provides beneficial treatment to the bedding material. However, it has been found that a bit 22 having three blades 47 which are generally parallel to the surface to be treated provides satisfactory conditioning of the bedding material.

The blade geometry may be altered to achieve a preferred bedding texture. For example, blades 47 might have a slight pitch or have a scooped shape to provide a larger contact area to the bedding material. Rotor 20 may also be equipped with a plurality of gussets 48. The gussets 48 may be triangular pieces of material welded to the side of the shaft 42, which are attached to the portion of shaft which extends below the bottom side 38 of the rotor arm 16, such that the gussets are aligned parallel to the longitudinal axis of the shaft 42. The gussets 48 act to stiffen the rotor 20, and also assist in lifting bedding material as it is loosened by the bit 22. As indicated on FIG. 3, the bit 22 may also comprise a vertical tip 49 which provides additional penetration into the bedding material.

The disclosed invention further comprises means for rotating the rotors 20, which may comprise a hydraulic motor 24 attached to the rotor arm 16. FIG. 5 shows one means for rotating the rotors 20 with hydraulic motor 24 rotating drive belt 50. As shown in FIG. 5 and FIG. 6, shaft 42 extends through the bearing unit 18 such that the first end 44 is on the bottom side 38 of the rotor arm 16 and the second end 46 is on the top side 36. It is to be appreciated that while FIG. 5 shows drive belt 50 as a cog belt, a vee belt or chain would serve the same purpose. In addition, the means for rotating the rotors may also comprise a plurality of intermeshing cog gears driven by the hydraulic motor 24, where a cog gear is attached to second end 46 of shaft 42. Drive belt 50 rotates the shaft 42 of each rotor 20. The drive belt 50 makes contact with the second end 46 of each shaft 42. As shown in FIG. 5, a cog wheel 52 may be attached to the second end 46 of each shaft 42. Lock bushing 54 may be used to secure the cog wheel 52 to the shaft 42. Belt idlers 56 may also be used with the rotation means to assist in maintaining the correct tension of drivel belt 50. Rotor arm 16 may be enclosed with cover 62 to protect the various moving components of the rotor arm.

Rotor arm 16 may be pivotally attached to frame 14, such that the rotor arm is pivotable through a range of positions, including a first position where the rotor arm is approximately horizontal, as shown in FIG. 1, and a second position, where the rotor arm is approximately vertical, as shown in FIG. 2. As shown in FIG. 5A and FIG. 6, pivoting connection 58 may be used to attach rotor arm 16 to the frame 14. The device may also comprise means for pivoting the rotor arm 16, such as a hydraulic ram 60.

The device may further comprise a hydraulic control yoke 62 which pivots toward the operator of the drive vehicle 12 to be easily accessible. As shown in the hydraulic schematic of FIG. 7, the hydraulic power fluid may supplied by the drive vehicle 12 using hydraulic controls such as a flow divider and relief valve. The vehicle operator may then actuate hydraulic ram 60 by operating the hydraulic controls to raise and lower the rotor arm 16. In addition, the operator may control hydraulic motor 24 with the controls, so that the operator can cause rotors 20 to start rotating and to stop. With these controls, the vehicle operator is able to proceed down a drive-through alley, raising and lowering the rotor arm 16 as required to condition particular free-stalls, and to engage and disengage the rotors 20 as desired.

While the above is a description of various embodiments of the present invention, further modifications may be employed without departing from the spirit and scope of the present invention. For example, the size, shape, position and/or material of the various components may be changed as desired. Thus the scope of the invention should not be limited by the specific structures disclosed. Instead the true scope of the invention should be determined by the following claims.

What is claimed is:

1. An apparatus for conditioning livestock bedding comprising;
   (a) a self-propelled drive vehicle having a front and a back;
   (b) a frame attached to the drive vehicle;
   (c) a rotor arm having a top side and a bottom side, the rotor arm extending from the frame;
   (d) a bearing unit set within the rotor arm;
   (e) a rotor set within the bearing unit, the rotor comprising a shaft having a first end and a second end, the first and second end defining a longitudinal axis, the first end compromising a bit, the shaft extending through the bearing unit with the first end on the bottom side and the second end on the top side of the rotor arm wherein the rotor further comprises a plurality of gussets attached to the portion of the shaft from the first end to the bottom side of the rotor arm, the gussets aligned parallel to the longitudinal axis of the shaft; and (f) means for rotating the rotor, said means compromising a hydraulic motor attached to the rotor arm, the hydraulic motor rotating a drive belt, the drive belt rotating the shaft of the rotor.

2. The apparatus of claim 1 wherein the frame is attached to the front of the drive vehicle.

3. The apparatus of claim 1 further comprising a ground engaging support wheel attached to the frame.

4. The apparatus of claim 1 further comprising a curb scraper attached to the frame.

5. The apparatus of claim 1 wherein the drive vehicle further comprises ground-engaging wheels.

6. The apparatus of claim 5 wherein the drive vehicle comprises a skid steer.

7. The apparatus of claim 1 further comprising a plurality of belt idlers attached to the rotor arm the idler pulleys maintaining tension on the drive belt.

8. The apparatus of claim 1 further wherein the shaft of the rotor comprises a cog wheel, the drive belt engaging said cog wheel.

9. The apparatus of claim 8 further comprising a lock bushing securing the cog wheel to the shaft.

10. The apparatus of claim 1 wherein the bit comprises three blades.

11. The apparatus of claim 1 wherein the bit comprises a vertical tip.

12. An apparatus for conditioning livestock bedding comprising;

(a) a self-propelled drive vehicle having a front and a back;

(b) a frame attached to the drive vehicle;

(c) a rotor arm having a top side and a bottom side, the rotor arm pivotally attached to the frame, the rotor arm pivotable through a range of positions from an approximately horizontal first position to an approximately vertical second position;

(d) a bearing unit set within the rotor arm, the bearing unit extending from the top side to the bottom side;

(e) a rotor set within the bearing unit, the rotor comprising a shaft having a first end and a second end, a longitudinal axis defined by the first end and the second end, the first end compromising a bit, the bit engaging the ground when the rotor arm is in the first position, the shaft extending through the bearing unit with the first end on the bottom side and the second end on the top side of the rotor arm wherein the rotor further comprises a plurality of gussets attached to the portion of the shaft from the first end to the bottom side of the rotor arm, the gussets aligned parallel to the longitudinal axis of the shaft;

(f) means for rotating the rotor, said means compromising a hydraulic motor attached to the rotor arm, the hydraulic motor rotating a drive belt, the drive belt rotating the shaft of the rotor; and (g) means for pivoting the rotor arm from the first position to the second position and from the second position to the first position.

13. The apparatus of claim 12 wherein the frame is attached to the front of the drive vehicle.

14. The apparatus of claim 12 further comprising a curb scraper attached to the frame.

15. The apparatus of claim 12 further comprising a ground engaging support wheel attached to the frame.

16. The apparatus of claim 12 wherein the drive vehicle further comprises ground-engaging wheels.

17. The apparatus of claim 12 wherein the drive vehicle comprises a skid steer.

18. The apparatus of claim 16 further comprising a plurality of belt idlers attached to the rotor arm, the idler pulleys maintaining tension on the drive belt.

19. The apparatus of claim 12 further wherein the shaft of the rotor comprises a cog wheel, the drive belt engaging said cog wheel.

20. The apparatus of claim 19 further comprising a lock bushing securing the cog wheel to the shaft.

21. The apparatus of claim 12 wherein the bit comprises three blades.

22. The apparatus of claim 12 wherein the bit comprises a vertical tip.

23. The apparatus of claim 12 wherein the means for pivoting the rotor arm comprises a hydraulic ram having a first end and a second end, the first end attached to the frame and the second end attached to the rotor arm.

24. The apparatus of claim 23 further comprising hydraulic controls operationally connected to the hydraulic ram.

25. An apparatus for conditioning livestock bedding comprising;

(a) a self-propelled drive vehicle having a front and a back, the front and back defining a first axis;

(b) a first frame member attached to the front, extending forward therefrom, the first frame member aligned approximately parallel to the first axis;

(c) a rotor arm having a top side, a bottom side, and a rotor cover, the rotor arm pivotally attached at a right angle to the first frame member, the rotor arm defining a second axis the rotor arm pivotable through a range of positions from an approximately horizontal first position to an approximately vertical second position;

(d) a plurality of bearing units set within the rotor arm, each bearing unit extending from the top side to the bottom side, the bearing units aligned with each other along an axis parallel to the second axis;

(e) a plurality of rotors set within the bearing units, each rotor comprising a shaft having a first end and a second end, the first end and second end defining a longitudinal axis, the first end comprising a bit, the bit engaging the ground when the rotor arm is in the first position, the shaft extending through the bearing unit with the first end on the bottom side and the second end on the top side of the rotor arm, the bit comprising a plurality of blades, each blade at an approximate right angle to the shaft;

(f) means for rotating the rotors, said means comprising a hydraulic motor attached to the rotor arm, the hydraulic motor rotating a drive belt, the drive belt rotating the shaft of the rotor;

(g) the rotors further comprising a plurality of gussets attached to the portion of the shaft from the first end to the bottom side of the rotor arm, the gussets aligned parallel to the longitudinal axis of the shaft; and (h) means for pivoting the rotor arm from the first position to the second position and from the second position to the first position.

26. The apparatus of claim 25 wherein the drive vehicle further comprises ground-engaging wheels.

27. The apparatus of claim 25 wherein the drive vehicle comprises a skid steer.

28. The apparatus of claim 25 further comprising a ground engaging support wheel attached to the first frame member.

29. The apparatus of claim 25 further comprising a curb scraper attached to the first frame member.

30. The apparatus of claim 25 further comprising a plurality of belt idlers attached to the rotor arm, the idler pulleys maintaining tension on the drive belt.

31. The apparatus of claim 25 wherein the shaft of each rotor comprises a cog wheel, the drive belt engaging said cog wheel.

32. The apparatus of claim 31 further comprising a lock bushing securing the cog wheel to the shaft.

33. The apparatus of claim 25 wherein the bit comprises three blades.

34. The apparatus of claim 25 the bit comprises a vertical tip.

35. The apparatus of claim 25 wherein the means for pivoting the rotor arm comprises a hydraulic ram having a first end and a second end, the first end attached to the frame and the second end attached to the rotor arm.

36. The apparatus of claim 25 further comprising hydraulic controls operationally connected to the hydraulic ram.

* * * * *